United States Patent

[11] 3,566,022

[72] Inventors Robert M. Bishop
Arlington Heights;
Joel C. Goldberg, Chicago, Ill.
[21] Appl. No. 738,299
[22] Filed June 19, 1968
[45] Patented Feb. 23, 1971
[73] Assignee Stewart-Warner Corporation
Chicago, Ill.

[54] FACSIMILE PAPER CUTTER WITH FIRST CUT MEANS
4 Claims, 2 Drawing Figs.

[52] U.S. Cl. .......... 178/6.6, 178/5
[51] Int. Cl. .......... H04n 1/22
[50] Field of Search .......... 178/6, 6.6, 6.6 (A)

[56] References Cited
UNITED STATES PATENTS
3,303,280 2/1967 Fox et al. .......... 178/6.6A
3,135,179 6/1964 Cerasani et al. .......... 178/6.6A

*Primary Examiner*—Richard Murray
*Assistant Examiner*—Barry Leibowitz
*Attorneys*—Augustus D. Douvas, William J. Newman and Norton Lesser

ABSTRACT: Apparatus for severing recording medium in a document reproduction system, such as facsimile, wherein the recording medium at the recorder is caused to be automatically cut at the beginning and end of each reproduced document as well as at an intermediate point along the long unmarked lead to the first document caused by the runup of the medium after a preceding document and/or the medium runup during the initial phasing period before the marking of the next document.

INVENTORS

ROBERT M. BISHOP

JOEL C. GOLDBERG

By William J. Kernan

Attorney

Figure 1:
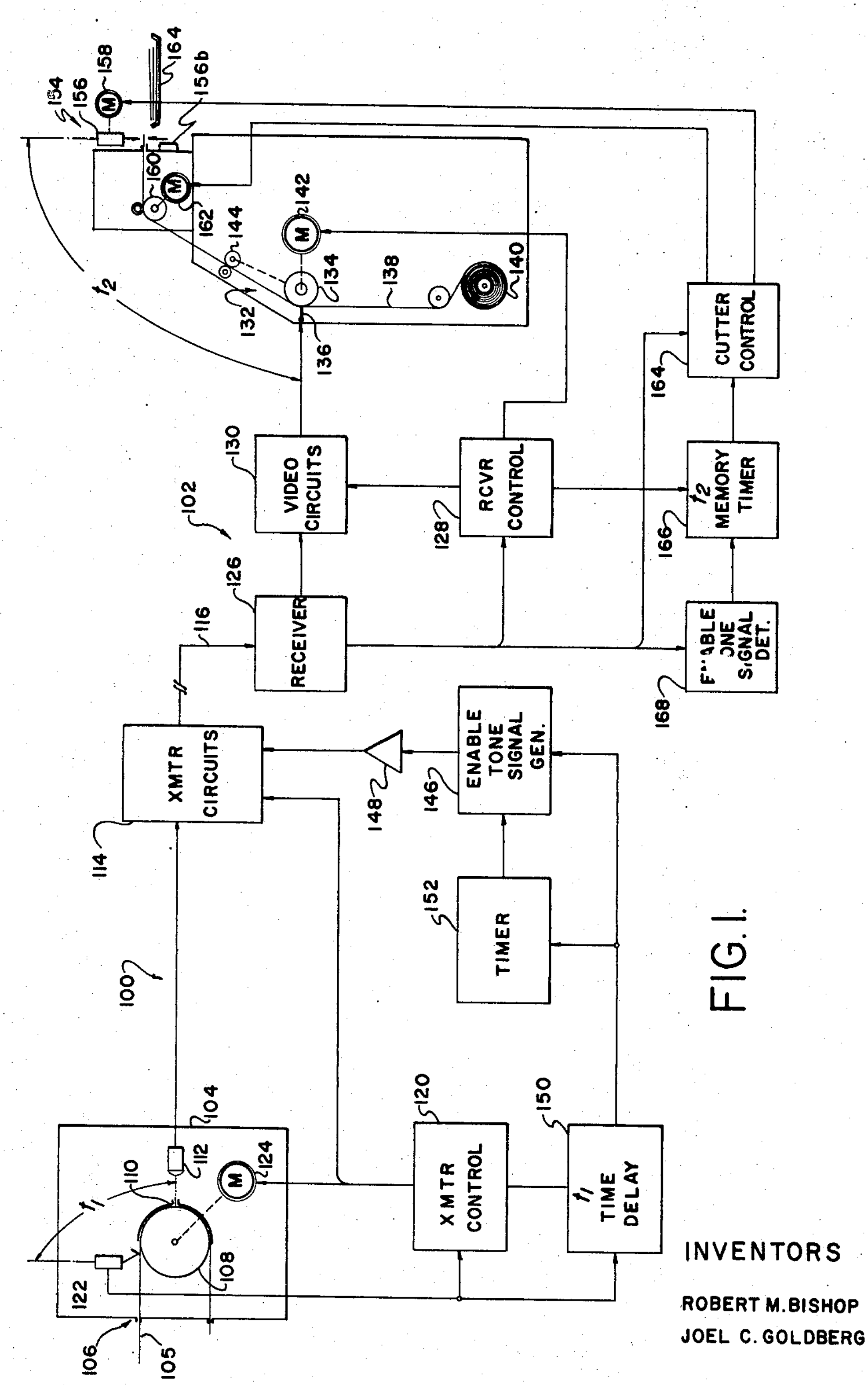

INVENTORS
ROBERT M. BISHOP
JOEL C. GOLDBERG

By William J. Herman
Attorney

FACSIMILE PAPER CUTTER WITH FIRST CUT MEANS

BACKGROUND OF THE INVENTION

This invention relates to recording medium severing apparatus in copy reproduction systems and is an improvement of the type disclosed in the prior application of Joel C. Goldberg and Dudley Gray, Ser. No. 712,165, filed Mar. 11, 1968. Although the invention is described herein as it relates to facsimile systems, at least some of the features are applicable to medium severing apparatus for other types of systems.

Generally, a facsimile system comprises a transmitter on which means are provided to scan the document and produce signals which vary in accordance with the light intensity of the segment being scanned. The receiver at a remote location applies the varying signals to a recorder means which produces marks on a recording medium such as an electrolytic paper in accordance with the document being scanned at the transmitter. Recording medium is ordinarily supplied from a roll in the recorder housing, and is driven along a path through the marking means and out of the recorder.

Although the recording medium is driven through the recorder in synchronism with the transportation of the copy document through the transmitter when the document is being scanned, there are occasions when the recording medium is being moved through the recorder when a document is not being reproduced. For example, in some systems the recorder is operated for a predetermined time period after the transmission of the document in order to run the document out of the recorder housing so it may be viewed by an operator. In the system described in the aforementioned application and in the present system the recording medium is severed at the lagging edge of that reproduced document but a blank portion of the medium then extends from the marking means to the severing apparatus. Furthermore, in many systems the recording medium is caused to move through the recorder during the synchronizing and phasing period immediately prior to the reproduction of the next document. This then presents an additional length of unmarked recording medium extending from the already cut lagging edge of the previously reproduced document and the leading edge of the next reproduced document. In some facsimile systems this recording medium lead portion might be 15 to 20 inches. This of course is much longer than the ordinary document being reproduced so that this lead portion would not fit conveniently in a document catching tray if such is designed to receive normal length documents.

SUMMARY OF THE INVENTION

Apparatus for properly severing the recording medium comprises a medium-severing device such as cutting blades located a distance from the recorder marking means and means for driving the recording medium from the marking means to the severing device. Means are provided to control the operation of the severing device responsive to the reproduction of the document to sever the medium at places corresponding to the leading and lagging edges of the document along with means for automatically causing the severing device to sever the medium at an intermediate place between the lagging edge of a last preceding document reproduction and the leading edge of the next document reproduction.

Figure 2:
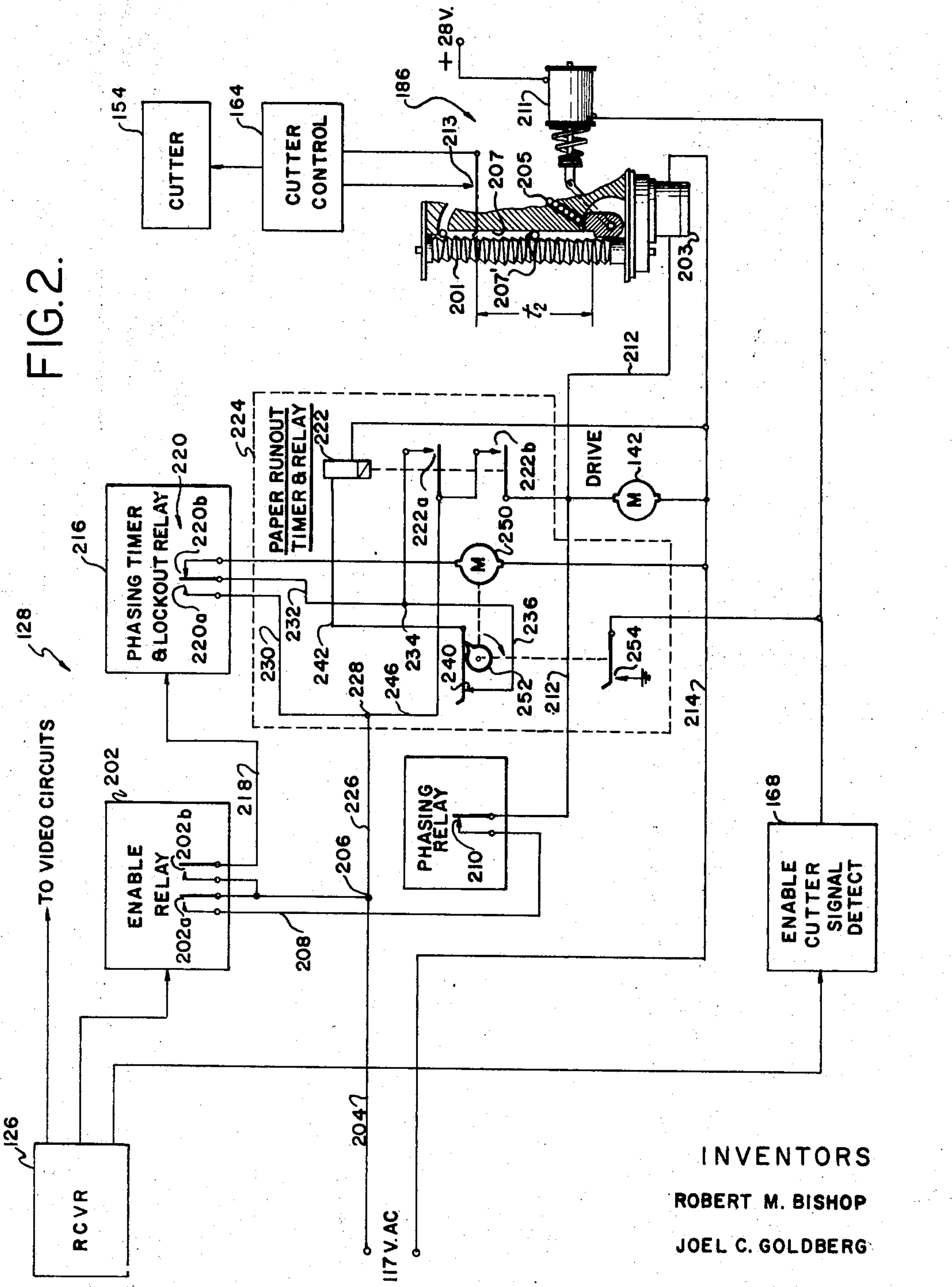

This invention will be better understood by a further reading of the specification especially when taken along with the accompanying drawings in which:

FIG. 1 is a block diagram of a recording medium severing system as used with a facsimile transmission system; and FIG. 2 is a schematic diagram of the control circuit for providing the intermediate cut in the lead portion of the recording medium.

The system shown in FIG. 1 includes a facsimile transmitter, referenced generally at 100, and a remotely located recorder, generally referenced at 102. The transmitter comprises scanning means 104, of any well-known type, in which a document 105 to be reproduced is insertable at an inlet 106 and driven by means of a drive roller 108 past a scanning slit 110. The document passing the slit 110 is scanned from side to side and signals are developed by a photocell 112 in accordance with the changes in reflected light intensity. These signals are prepared by transmitter circuits 114 for transmission via telephone lines 116 or other appropriate media, to the remotely located recorder 102.

The transmitter 100 also includes control circuits 120 which control the operation of the transmitter including the phasing mode for synchronizing the recorder and the subsequent switching to video mode thereafter for transmitting the document data. The operation of the transmitter control is normally initiated by a copy document switch 122 which senses the insertion of the document to be reproduced. The copy document switch is located immediately adjacent the point at which the drive roller 108 begins driving the document. Ordinarily, it is also very close to the document inlet 106. The copy document switch 122 initiates the operation of the transmitter control to provide a phasing period of perhaps 25 to 30 seconds. During this period phasing signals are sent through the transmitter circuits 114 and telephone lines 116 to the recorder 102 ,which are used to bring the recorder into synchronization with the transmitter. After the phasing period the transmitter control enables the transmitter circuits for video transmission of the document. The transmitter control 120 also energizes a copy drive motor 124 which, by means of drive roller 108, starts the document towards the scanning slit 110. In some systems the document drive is started at the beginning of the phasing period while in others it is started during or after completion of the phasing period. The system shown herein is adapted to operate properly regardless of the start time of the document drive.

The facsimile recorder 102 includes a receiver 126 which receives and separates the control and video signals from the transmitter. The video signals are handled by well-known video circuits 130 and applied to appropriate marking apparatus 132 such as a rotatable helix electrode drum 134 and linear electrode 136. These two electrodes cooperate to mark the recording medium 138 passing therebetween from a supply roll 140.

The control signals detected by the receiver 126 are directed to a receiver control circuit 128. The receiver control 128 controls the energization of drive motor 142 which operates the marking means 132. In many systems the drive motor 142 also provides the motive power for the recording medium through appropriate gears to a drive roller 144. Also in some systems an additional motor (not shown) is provided which drives the paper at a faster speed during the phasing period in order to assure fresh marking medium being available at the marking means when the document reproduction signals are being received. In other systems the drive roll 144 is driven by a separate motor which is electrically synchronized with the marking means motor 142 so as to insure proper document reproduction. The present invention is applicable to any of these systems as will be apparent.

When phasing signals are received from the transmitter at the beginning of document transmission, the receiver control 128 causes the drive motor 142 to operate and synchronize itself with the phasing signals so as to properly align the recorder 102 with the transmitter 100. At the end of the phasing period the receiver control then enables the video circuits 130 to pass the video signals to the marking means 132 to cause the reproduction of the document on the recording medium. The video signals continue until the lagging edge of the copy document 105 at the transmitter passes the scanning slit 110. If another document follows thereafter within any short predetermined time, the transmitter control 120 maintains the transmitter in its video mode without providing a new phasing period and the reciever 102 is maintained in a reproduction mode to record the next document as it is transmitted. A short portion of unmarked recording medium, therefore, appears between the two documents represented by the time interval between the scanning of the lagging edge of the first document and the leading edge of the succeeding document. Such a short portion of unmarked paper need not be intermediately severed as it will easily fit into a document tray.

If another document is not inserted into the transmitter 100 within a predetermined time the transmitter control 120 turns off the transmitter and the loss of signals therefrom by the recorder 102 is detected by the receiver control 128. In most systems, however, the receiver control continues the energization of the recording medium drive means for at least a short period of time to drive the document reproduction through the medium outlet in the recorder housing.

The recording medium severing apparatus in the system shown comprises a tone generator 146 which produces an enabling signal through an amplifier 148 and the transmitter circuits 114 to the recorder 102 when the leading edge and the lagging edge of a copy document reaches the scanning slit 110 in the scanning means 104. The tone generator 146 is controlled to produce the signal at the proper time by means of a time delay apparatus 150. The time delay apparatus 150 is designed to account for the time $t_1$ it takes for the document to reach the scanning slit 110 after the copy document drive roller 108 starts feeding it thereto. As previously discussed, this time period for the leading edge starts during or after the phasing period if another document had not immediately preceded it. If, however, the document is one of a succession of documents, but not the first document, the period $t_1$ starts by the operation of the copy feed switch 122 caused by the insertion of the leading edge of the document. Thus when the document starts to be fed by the copy feed roller 108 towards the scanning slit 110, the time delay circuit 150 is energized. After the time period $t_1$, representing the time for the document to reach the scanning slit 110, the time delay 150 causes the tone generator to generate an enable tone signal for transmission to the recorder 102. Timer 152 limits the time length of the enable signal from the tone generator 146. When the lagging edge of the document reaches the copy feed switch 122, the time delay apparatus 150 is again energized. The tone generator 146 is caused thereby to reproduce another enable signal at a time interval $t_1$ after the release of the copy feed switch 122 which represents the time for the lagging edge to travel to the scanning slit 110. Thus, an enable signal is transmitted to the recorder at the time the leading edge of a copy document reaches the scanning slit and again at the time the lagging edge reaches the scanning slit.

The particular circuits used for the enable tone signal generator 146, the amplifier 148, the $t_1$ time delay 150 and the timer 152 may be the same as disclosed in detail in the aforementioned Goldberg-Gray application and hence are not shown in detail herein.

The apparatus for severing the recording medium at the recorder 102 comprises a severing device 154 such as an electrically controlled paper cutter of the type disclosed in the copending application of F. Thomas Bilek, Ser. No. 592,809, filed Nov. 8, 1966, U.S. Pat. No. 3,465,632, granted Sept. 9, 1969. Briefly, such a device comprises a set of cutter blades **156*a*, 156*b*, at least one of which is actuated by a motor drive means 158. The recording medium is drawn from the recorder and through the cutting apparatus by means of a separate drive roller 160 and drive motor 162**.

The paper cutter device 154 is actuated by a cutter control circuit 164 which in turn is controlled by a memory timer 166. The operation of the memory timer is initiated when an enable signal from the transmitter is detected by a tone signal detector 168 after the enable signal has been processed by the receiver 126. The memory timer 166 delays the operation of the paper cutter device 154 for a time period $t_2$ after the receipt of the enable signal from the transmitter which represents the time for a portion of the recording medium 168 to pass from the marking means 132 to the cutter blades **156*a*, 156*b*. It will be recalled that the enable signals are transmitted when the leading edge and the lagging edge of the copy document arrive at the scanning slit 110 in the transmitter. Thus, the portions of the paper at the marking means 132 when the enable signals are received represent the leading edge and lagging edge, respectively, of the reproduced document. Timer 166 delays the operation of the cutter device 154** until those portions of the recording medium reach the cutter blades so that the document may be accurately cut at its leading and lagging edges.

The memory timer 166 may be of the type described in detail in the aforementioned Goldberg-Gray application which is constructed so that it can time a multiplicity of events simultaneously. Such a timer is shown schematically in FIG. 2 and comprises a rotatable threaded member 201 driven by a constant speed motor 203 energized by 117 volt AC power provided through a circuit in the receiver control 128 hereinafter described in detail. A supply of small elements or balls 205 are injected into a groove 207 axially aligned with the rotating member 201 by a pivot arm 209 operable by a solenoid 211. A switch 213 is provided along the path of the balls as they are carried by the threads on the rotating member 202 so as to be actuated a time interval $t_2$ after injection into the groove 207. The switch 213 actuates the cutter control circuit 164 which in turn controls the operation of the cutter blade motor 158 in the paper-severing device 154 as described in the aforementioned Goldberg-Gray application.

A multiple event timer 166 is used because in most systems the physical distance between the marking means 132 and the paper cutter blades **156*a* and *b* is substantially longer than a normal copy document. Thus, the enabling signals for both the leading edge and the lagging edge will ordinarily be sent to the recorder 102 before the paper-cutting device 154 is actuated for the leading edge. The timer 166 includes a memory so that it can store and separately time the delay period for the leading and lagging edges of the document. Furthermore if short documents are being scanned, one or more succeeding documents may be recorded on the medium before the first document reaches the cutting blades. The memory timer keeps track of each leading and lagging edge to properly initiate their cuts. The circuits used for the cutter control 164, the $t_2$ memory timer 166 and the enable tone signal detector 168** may be of the type shown in detail in the aforementioned Goldberg-Gray application and hence are not described in detail herein.

There are provisions in the present system for providing an intermediate cut in the lead portion of recording medium before the document copy. As previously indicated, the lead portion represents at least in part the unmarked portion of recording medium caused to be driven past the recorder recording means after the transmission of the last document until the lagging edge thereof reached the cutter blades **156*a*, 156*b*. The length of recording medium extending from the recording means 134, 136 to the cutter blades 156*a*, 156*b* is therefore unmarked and represents scrap recording medium. If the facsimile system is of the type that the recording medium is driven during the phasing period before the transmission of the next document, another portion of the medium 138 will pass the recording means 134, 136 and be driven towards the cutter before the leading edge of the next document is signalled. This long length of unmarked medium extending from the lagging edge cut of the precious document and the leading edge of the next document is generally too long to fit in a document catching tray 164 provided adjacent the cutter blades 156*a*, 156*b*. The system herein described provides for cutting this leading edge waste length into at least two smaller pieces which may be neatly stacked in the tray 164** instead of having one long length of scrap which would overhang the tray.

Reference is now made to FIG. 2 which shows the receiver control circuits for controlling the operation of the recorder and for providing the extra cut in accordance with this invention. As previously mentioned, the transmitter initiates transmission with phasing signals if it has been in the idle or standby condition for a period of time. The receipt by receiver 126 of the phasing signals causes the receiver control 128 to initiate a phasing period during which time the recorder 102 is synchronized with the sending transmitter. The phasing is started by the energization of an enabling relay 202 in the receiver control 128. The closure of enabling relay contacts 202a completes a circuit to the recorder drive motor 142 from the 117 volt AC source through conductor 204, junction 206, contacts 202a, conductor 208, phasing relay contacts 210, conductor 212, through drive motor 142 and back through the return line 214 to the 117 volt AC source. It may be seen that the drive motor 203 of the memory timer 166 is in parallel with the drive motor 142 so it is also energized by the closure of enabling relay contacts 202a, thus preparing it for initiation of a timing event at any time during the operation of the driving motor 142. The phasing relay contacts 210 may be caused to momentarily open one or more times during the phasing period causing the AC drive motor 142 to drop back a pole for each interruption to bring it in synchronization with the received phasing signals in a manner well known in the facsimile art.

The length of the phasing period of the receiver is determined by a phasing timer and lockout relay 216 which receives a signal over conductor 218 when the enabling relay 202 is energized to close its contacts 202b at the beginning of the phasing period. The phasing timer and lockout relay 216 has a timer therein of any well-known type which operates to actuate the single pole-double throw contacts 220 a predetermined time after the actuation of the enabling relay 202. The closure of contacts 220a completes a circuit through a relay 222 in the paper runout timer and relay circuit 224 leading from the 117 volt AC source through conductor 204, junction 206, conductor 226, junction 228, conductor 230, contacts 220a, conductor 232, junction 234, conductor 236, timer contacts 240, conductor 242, the coil of relay 222, conductor 244, and back through the return line 214 to the AC source. The energization of relay 222 closes its contacts 222a which parallels the phasing timer and lockout relay contacts 220a between junction 228 and junction 234 to provide a hold for the relay 222. The closure of contacts 222b completes a parallel circuit across the series connection of the enabling relay contacts 202a and phasing relay contacts 210 leading to the drive motor 142 and the memory timer motor 203. This parallel circuit may be traced from junction 206 to which enable relay contacts 202a are connected, through conductor 226, junction 228, conductor 246 and contacts 222b to the conductor 212 connected to the drive motor 142 and the memory timer motor 204.

The receiver control circuit 128 of the recorder remains in this condition during the video transmission when the copy document is being reproduced.

Of course, when the first enable cutter signal is received signifying the leading edge of the document at the transmitter has reached the scanning slot, the solenoid 211 will be energized by cutter signal detector 168 to release a ball into the timer 186. Furthermore, another ball will be released when another cutter signal is detected by the circuit 168 signifying the lagging edge of the document reaching the transmitter scanning slot.

At the end of transmission, a signal is no longer received from the transmitter and the enable relay 202 is deenergized opening its contacts 202a and 202b. The opening of contacts 202a has no effect on the drive motor 142 and the memory timer motor 204 because of the previously described parallel circuit therearound including the paper runout timer and relay contacts 222b. The opening of contacts 202b cause the phasing timer and lockout relay 216 to deenergize opening contacts 220a and closing contacts 220b. The opening of contacts 220a has no effect on the circuit at this time because of the hold circuit for the relay 222 through its contacts 222a as previously described. The closure of contacts 220b however completes a circuit to a timer motor 250 in the paper runout timer and relay circuit 224 extending from the 117 volt AC source through conductor 204, junction 206, conductor 226, junction 228, conductor 246, contacts 222a, junction 234, conductor 232, contacts 220b and through motor 250 to the return conductor 214 to the AC source. The motor 250 drives a cam 252 which rotates in the direction shown until it opens the timer contacts 240 in the hold circuit for the relay 222. When relay 222 deenergizes its contacts open, opening the circuits to the drive motor 142 and the memory timer motor 204. It also opens the circuit to the timing motor 250 to restore the whole receiver control circuit 128 to its standby condition. The above described receiver control circuits are well known in the facsimile art for controlling a facsimile recorder.

The timer including the motor 250, cam 252 and contacts 240 establish the time period after the completion of the video transmission during which the paper 138 (FIG. 1) is driven so as to transport the lagging edge of the last recorded document from the marking means 134, 136 to the recording medium cutting blades 156a, 156b. The time period at the beginning of the transmission during which the recorder is being synchronized with the transmitter and waste paper is being driven past the recording means towards the cutter is determined by the timer in the phasing timer and lockout relay 216.

The extra cut desired during the long leading edge waste portion preceding a first transmitted document is controlled by a set of contacts 254 adapted to be actuated by the cam 252 in the paper runout timer and relay 224. The actuation of contact 254 completes a circuit to ground from the 28 volt source through the solenoid 211 of the memory timer 186 to thus inject a ball 206 into the channel 208. Since the motor 204 is still operating the ball will be driven upward by the rotating threaded member 202 until the paper runout timer and relay cam 252 reaches the end of its cycle opening contacts 240. As previously described the power to the drive motor 142 and the memory timer motor 204 is then interrupted until the next receipt of document transmission signals from a transmitter. The ball that was introduced into the timer channel 208 by the actuation of the contacts 254 is stopped at the position represented by ball 206′ and remains there until the next transmission. When the next transmission starts the drive motor 142 and the memory timer motor 204 are again energized at the beginning of the phasing period and the ball 206′ continues on its way towards the contacts 214 which actuate to cause the cutter control 164 to operate the cutter 154.

The distance that the ball travels during the paper runout period of the preceding transmission is of course determined by the position of the contacts 254 with respect to the cycle of the cam 252. Ordinarily the contacts 254 would be positioned so that the ball rises a distance corresponding to about one-half the sum of the phasing time period plus $t_2$ before the drive motor 142 and timer motor 211 stop so that the waste-leading edge will be cut into two equal parts. If it is desired that the waste-leading edge be cut into additional pieces, a corresponding number of contacts 254 may be placed along the path of the paper runout timer cam 252 to cut the leading edge as many times as desired.

While a preferred embodiment of this invention has been shown and described herein, it is understood that modifications and additions may be made thereto without materially deviating from the teachings herein. It is therefore intended to be bound only by the scope of the appending claims.

We claim:

1. In a document reproduction system in which a document is scanned from a leading edge to a lagging edge and is reproduced by marking means on a substantially continuous sheet of recording medium, medium-severing apparatus comprising a medium-severing device located a distance from said marking means, means for driving said medium from said marking means to said severing device, a first timer operable responsive to either one of said document edges passing said marking means for actuating said severing means a predetermined time after said edge passing corresponding to the time required for said driving means to drive said medium from said marking means to said severing device and a second timer operable when a document-lagging edge passes said marking means for initiating the operation of said first timer to cause said severing device to sever said medium at an intermediate place between the lagging edge of a last preceding document reproduction and the leading edge of the next document reproduction.

2. Facsimile recording medium-severing apparatus for use with a facsimile receiver which records a document copy on a substantially continuous sheet of recording medium extending from a supply roll past a marking means and to the severing apparatus, said receiver having medium-driving means for driving said medium when said receiver is receiving signals from a transmitter and for a predetermined period after said signals cause to drive the reproduced document from said marking means to the severing apparatus, said medium-severing apparatus comprising a medium-severing device, means for controlling said severing device to sever said medium at the beginning and end of each document, and means operative responsive to the beginning of receipt of signals from said transmitter to initiate recording of a new document for causing said severing device to sever said medium at an intermediate place along the portion of said medium which passed between said recording means and said severing device during said predetermined period after the last preceding document.

3. Facsimile recording medium-severing apparatus for use with a facsimile receiver having means for recording a document copy from a leading edge to a lagging edge on a substantially continuous sheet of recording medium extending from a supply roll past a marking means to the severing apparatus, said receiver also having medium-driving means for driving said medium and means for actuating said medium-driving means when said receiver is receiving signals from a transmitter and for a predetermined time period after said signals cease to drive the lagging edge of the reproduced document on said medium to the severing apparatus, said medium-severing apparatus comprising a severing device, a memory timer operative to measure a timing event and to actuate said severing device at the end of a timing event, the length of a timing event corresponding to the time required for said medium to pass from said marking means to said severing device, means including said actuating means for preparing said timer to be able to measure a timing event whenever said medium driving means is actuated, means for initiating a timing event at a time corresponding to the presence at the recording means of each leading and lagging edge, and means operable for initiating a timing event during said predetermined time period, said initiated timing event stopping at the end of said predetermined time period and restarting when signals begin for the next subsequent document copy.

4. In the apparatus of claim 3 wherein said preparing means comprises a relay operable responsive to the initiation of transmission signals to actuate said medium-driving means and to prepare said memory timer, said actuating means comprising a second timer operable responsive to the ceasing of transmission signals for measuring said predetermined period and for maintaining said driving means actuated and said timer prepared during said predetermined period, and wherein said timing event initiating means comprises a switch operable by said second timer for initiating said timing event during said predetermined period.